United States Patent [19]

Swanson

[11] Patent Number: 5,478,530
[45] Date of Patent: Dec. 26, 1995

[54] HOT MIX ASPHALT PLANT WITH CATALYTIC REACTOR

[75] Inventor: Malcolm L. Swanson, Chickamauga, Ga.

[73] Assignee: Astec Industries, Inc., Chattanooga, Tenn.

[21] Appl. No.: 310,629

[22] Filed: Sep. 22, 1994

[51] Int. Cl.⁶ .............................. B01J 8/02; B01D 50/00; B01D 53/56; B01D 53/86
[52] U.S. Cl. .................. 422/170; 208/39; 422/177; 422/187; 423/239.1; 423/245.3
[58] Field of Search .................... 422/169, 170, 422/177, 187, 168; 208/39, 44; 423/245.1, 239.1, 245.3

[56] References Cited

U.S. PATENT DOCUMENTS

| | | | |
|---|---|---|---|
| 4,600,379 | 7/1986 | Elliott | 432/13 |
| 4,867,572 | 9/1989 | Brock et al. | 366/25 |
| 4,875,436 | 10/1989 | Smith et al. | 422/180 X |
| 5,322,367 | 6/1994 | Nath et al. | 366/7 |

FOREIGN PATENT DOCUMENTS 4013191  11/1990  Germany.
1796734   2/1993  U.S.S.R..

Primary Examiner—Robert J. Warden
Assistant Examiner—Robert Carpenter
Attorney, Agent, or Firm—Nilles & Nilles

[57] ABSTRACT

An HMA plant has a catalytic reactor which can effectively and reliably reduce VOC and $NO_x$ emissions produced during plant operation. The reactor effectiveness is enhanced by exhausting the gas stream from a primary dryer of the plant at a sufficiently high temperature for effective catalytic reaction. Since withdrawal of gases from the dryer at these elevated temperatures necessarily reduces the effectiveness of the dryer, overall plant efficiency is maintained by using the treated gas stream from the catalytic reactor to heat further the aggregate in a secondary dryer, which is preferably a finishing dryer/mixer such as a fixed sleeve dryer drum coater. Poisoning of the catalyst is avoided by removing at least a large portion of the dust in the gas stream via a high efficiency cyclone prior to introducing the gas stream into the catalytic reactor. Ammonia or urea may if desired also be injected into the gas stream prior to its introduction into the catalytic reactor.

21 Claims, 1 Drawing Sheet

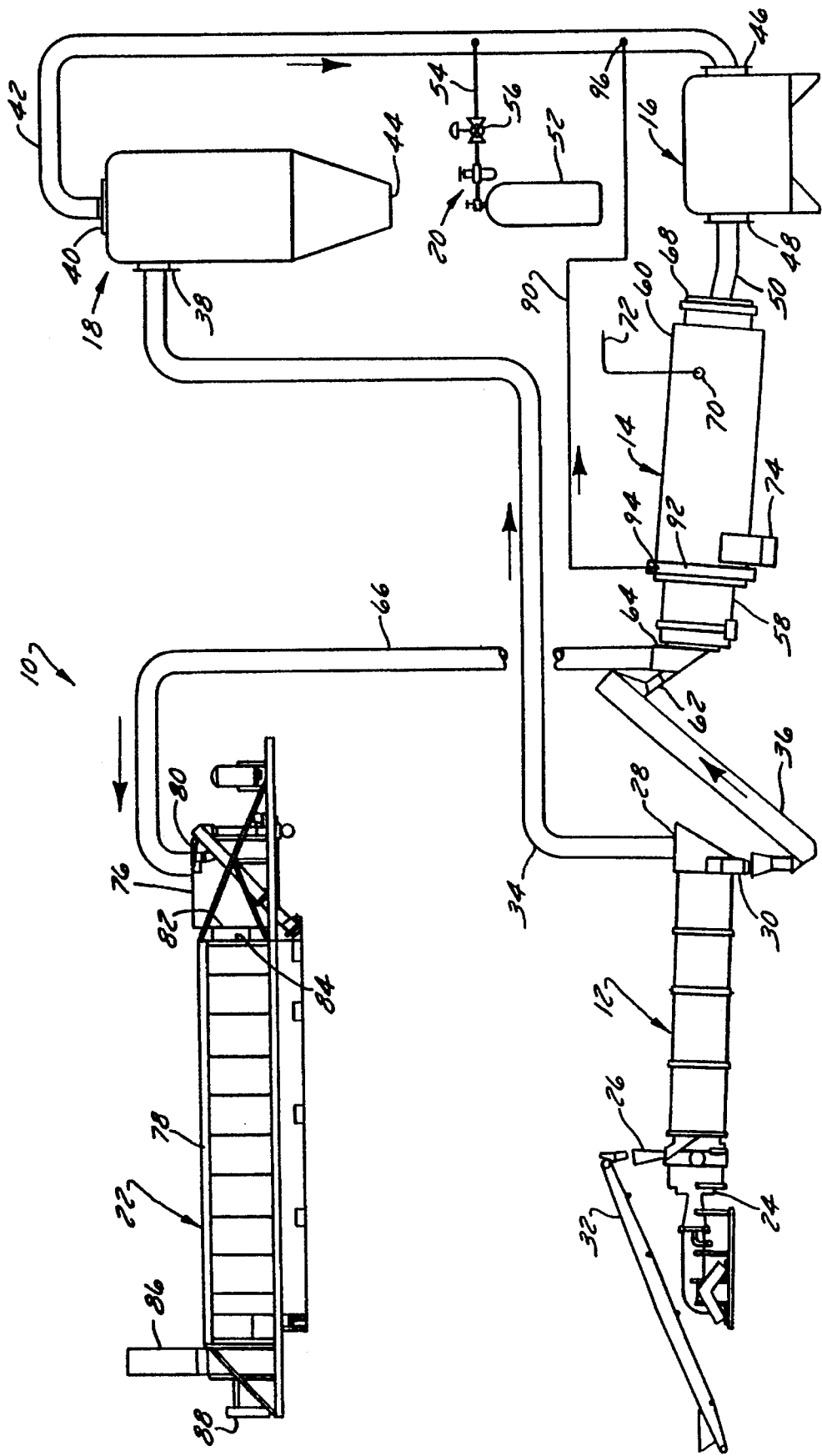

HOT MIX ASPHALT PLANT WITH CATALYTIC REACTOR

BACKGROUND OF THE INVENTION

1. Field of the Invention

The invention relates to asphalt production plants and, more particularly, relates to plants which are designed for the production of hot mix asphalt and which incorporate features for the reduction of VOC and $NO_x$ emissions.

2. Background of the Related Art

Plants for the production of hot mix asphalt (HMA) are well known and typically include a dryer for heating and drying stone aggregate; a coater-mixer for mixing the heated and dried stone aggregate with asphaltic cement (AC) in the form of liquid asphalt and possibly recycled asphalt product (RAP), dust or other materials; and a baghouse which removes dust from the gas stream(s) vented from the dryer and/or coater-mixer. The dryer typically comprises a heated parallel flow or counterflow inclined rotary drum dryer. The coater-mixer may comprise a pugmill or a fixed sleeve mixer of the type detailed below.

HMA plants typically present two major sources of emissions.

First, heat is typically supplied to the dryers of such plants via gas-fired burners, and emissions result through the incomplete combustion of fuel used to fire such burners and through combustion products from the burners. For instance, volatile organic compounds (VOCs) are produced through incomplete fuel combustion and oxides of nitrogen ($NO_x$) are formed as combustion products. Release of these emissions has historically been controlled through burner design. However, adequately controlling emissions through burner design alone is difficult, principally because a tradeoff is often required between the reduction of VOCs and $NO_x$. That is, VOC emissions are minimized at or near stoichiometric combustion conditions. $NO_x$ emissions, on the other hand, are minimized through off-stoichiometric combustion. Control of burners to minimize VOCs thus tends to increase $NO_x$ levels, and vice versa.

Faced with these difficulties and with the imposition of increasingly strict emission regulations, designers are turning to alternative measures such as flue gas recirculation to control emissions, particularly in certain areas of the country such as Southern California where emission regulations are particularly strict. These other measures have limited effectiveness and will likely prove inadequate in the long run as emission regulations become increasingly strict. The need has therefore arisen to provide better control of emissions from the dryers of HMA plants.

The second major source of emissions from HMA plants is from the coater-mixers in which the mixing of AC with hot aggregate tends to release VOCs through volatilization of VOCs in the AC. VOC production is particularly problematic in applications in which the AC includes RAP since the mixing of the RAP with the heated virgin aggregate produces relatively high amounts of hydrocarbon-laden vapors, collectively known as blue smoke. The amount of blue smoke formed during operation of coater-mixers can be reduced by limiting the exposure of the AC to the HMA to the minimum required for adequate mixing and coating, thus reducing the amount of volatilization; by reacting those VOCs which are formed with water vapor driven from the hot aggregate; and by promoting combustion of released hydrocarbons. The latter elimination technique may involve drawing the blue smoke into a dryer and recirculating the blue smoke into the burner flame, or directing the blue smoke from the coater-mixer to the air inlet port of the burner for the dryer. Both combustion techniques require that the blue smoke be burned, and such burning, even if effective, risks potentially adverse consequences such as partial burner flame quenching. The need has therefore arisen to reduce the emission of blue smoke from the coater-mixers of HMA plants.

It has long been known in other industries to reduce the levels of $NO_x$ and, to a lesser extent, VOCs in flue gases by reacting the gases with a metal catalyst provided on a ceramic substrate. This technique has, however, never been accepted in the HMA industry possibly because (1) the gas stream exhausted from the dryers of such plants are not at a sufficiently high temperature to react with any known catalyst, and (2) the dust in the gas streams tends to poison or to quickly render ineffective most catalysts.

OBJECTS AND SUMMARY OF THE INVENTION

It is therefore an object of the invention to provide a method of reducing VOC and $NO_x$ emissions from HMA plants through the reaction of the emissions with a catalyst.

In accordance with a first aspect of the invention, this object is achieved by providing a method comprising heating and partially drying virgin asphalt aggregate in a primary dryer, removing a gas stream from the primary dryer, then treating the gas stream with a catalyst thereby to reduce VOC and $NO_x$ levels in the gas stream, and then further heating and drying the virgin aggregate.

In order to maintain overall system efficiency, the step of further heating and drying preferably comprises feeding the virgin aggregate into a finishing dryer, feeding the gas stream into the finishing dryer after the gas stream is treated by the catalyst, and conveying the virgin aggregate through the finishing dryer in contact with the gas stream.

HMA production is preferably completed by mixing the virgin aggregate with asphaltic cement after the step of further heating and drying, thereby producing the HMA. The further heating and drying step and the mixing step take place in a single finishing dryer/mixer, and emissions are further reduced by removing blue smoke from the finishing dryer/mixer and feeding the blue smoke into an untreated gas inlet of the catalytic reactor.

Emissions can if desired be further reduced by injecting a chemical into the gas stream after the gas stream is removed from the primary dryer and before the gas stream is treated by the catalyst.

Another object of the invention is to provide a method of the type described above in which the emissions react with the catalyst without poisoning the catalyst and without significantly reducing the overall efficiency of the HMA production process.

In accordance with another aspect of the invention, a method is provided having one or more of the characteristics discussed above and further comprising removing dust from the gas stream after the gas stream is removed from the primary dryer and before the gas stream is treated by the catalyst.

Yet another object of the invention is to provide an efficient HMA plant which exhibits extremely low emissions of VOCs and $NO_x$.

In accordance with another aspect of the invention, this object is achieved by providing an apparatus comprising a source of virgin aggregate for the production of HMA; a primary dryer having an aggregate inlet connected to the source of virgin aggregate and having an exhaust gas outlet; and a catalytic reactor having an untreated gas inlet connected to the exhaust gas outlet of the primary dryer, a treated gas outlet, and a catalyst located between the untreated gas inlet and the treated gas outlet.

The system also preferably includes a finishing dryer having an aggregate inlet connected to an aggregate outlet of the primary dryer, a drying gas inlet connected to the treated gas outlet of the catalytic reactor, and an exhaust gas outlet. The finishing dryer is preferably a rotary counterflow dryer which in turn forms part of a dryer drum coater which comprises (1) the counterflow dryer and (2) a fixed sleeve which surrounds the counterflow dryer to define a mixing chamber therebetween. In order to reduce further emissions from the plant, a conduit is preferably provided having an inlet opening into the mixing chamber and an outlet communicating with the untreated gas inlet of the catalytic reactor.

A dust removal device is preferably provided having an inlet connected to the exhaust gas outlet of the primary dryer and having a gas outlet connected to the untreated gas inlet of the catalytic reactor.

A chemical injection system may if desired be positioned between the primary dryer and the catalytic reactor.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING

A preferred exemplary embodiment of the invention is illustrated in the accompanying drawing which schematically illustrates an HMA plant constructed in accordance with the preferred embodiment of the invention.

DETAILED DESCRIPTION OF THE PREFERRED EMBODIMENT

1. Resume

Pursuant to the invention, an HMA plant is provided having a catalytic reactor which can effectively and reliably reduce VOC and $NO_x$ emissions produced during plant operation. The reactor effectiveness is enhanced by exhausting the gas stream from a primary dryer of the plant at a sufficiently high temperature for effective catalytic reaction. Since withdrawal of gases from the dryer at these elevated temperatures necessarily reduces the effectiveness of the dryer, overall plant efficiency is maintained by using the treated gas stream from the catalytic reactor to heat further the aggregate in a secondary dryer, which is preferably a finishing dryer/mixer such as a fixed sleeve dryer drum coater. Poisoning of the catalyst is avoided by removing at least a large portion of the dust in the gas stream via a high efficiency cyclone prior to introducing the gas stream into the catalytic reactor. Ammonia or urea may if desired also be injected into the gas stream prior to its introduction into the catalytic reactor.

2. System Construction

Referring now to the drawing, a hot mix asphalt (HMA) plant 10 is provided which heats and dries virgin aggregate in two stages using a primary dryer 12 and a finishing dryer/mixer 14 both connected to a catalytic reactor 16. A dust removal device 18 and an ammonia injection system 20 are provided between the primary dryer 12 and the catalytic reactor 16, and a conventional baghouse assembly 22 is located downstream from the finishing dryer/mixer 14.

The primary dryer 12 may comprise any device capable of preliminarily heating or drying virgin or stone aggregate and of discharging a gas stream at a temperature suitable for catalytic reaction, and preferably comprises an inclined rotary drum dryer receiving heat from a gas-fired burner 24. The rotary drum dryer 12 may be either of the counterflow or parallel flow type but preferably is of the parallel flow type to facilitate the exhaust of gases at sufficiently high temperatures to promote catalytic reaction in the reactor 16. The primary dryer 12 thus has an upper aggregate inlet 26 located at the first or burner end of the dryer and an upper exhaust gas outlet 28 and lower aggregate outlet 30 located at a second end. The aggregate inlet 26 receives raw aggregate from a storage bin or the like via a suitable feed conveyor 32 which constitutes a source of aggregate for the HMA plant 10. The exhaust gas outlet 28 directs gases exhausted from the second end of the primary dryer 12 into a suitable duct 34. The aggregate outlet 30 discharges partially heated and dried aggregate from the second end of the dryer 12 into a suitable transfer conveyor 36 such as a drag chain conveyor.

The dust removal device 18 could be a high temperature baghouse or any other device capable of removing adequate dust from the gas stream in the duct 34 to prevent or to at least inhibit poisoning of the catalyst in the reactor 16, but preferably comprises a high efficiency cyclone having an inlet 38 connected to the duct 34, an upper gas outlet 40 connected to a reactor feed duct 42, and a lower dust outlet 44. Dust removed from the outlet 44 may be conveyed out of the system or mixed with the HMA in the coater-mixer as described, e.g., in U.S. Pat. No. 4,867,572 to Brock et al. and discussed in greater detail below.

The catalytic reactor 16 has an untreated gas inlet 46 connected to the feed duct 42, a treated gas outlet 48 connected to a feed duct 50 for the dryer/mixer 14, and has a catalyst stored therein for reaction with VOCs, $NO_x$ and other pollutants in the gas stream withdrawn from the exhaust gas outlet 28 of primary dryer 12. The catalyst stored in the reactor 16 may be any of various catalysts known to be effective in the reduction of $NO_x$ and VOCs in a gas stream. The catalyst may, for instance, take the form of a platinum catalyst provided in a ceramic sub-base similar to that used in automobile exhaust systems for the reduction of hydrocarbons.

Ammonia injection system 20 is preferably provided upstream of the catalytic reactor 16 and is designed to inject limited quantities of ammonia into the gas stream exhausted from the primary dryer 12 for preliminary reduction of $NO_x$. System 20 includes a tank 52, a supply line 54 emptying into reactor feed duct 42 upstream of the catalytic reactor 16, and suitable valves 56. Injection system 20 may, however, be eliminated in some instances, e.g., where its use is not cost effective or where emission regulations prohibit its use.

The finishing dryer/mixer 14 is designed to heat and dry further the aggregate received from the primary dryer 12 and to mix the thus heated and dried aggregate with asphaltic cement (AC). Finishing dryer/mixer 14 thus includes a dryer 58 and a coater-mixer 60. The dryer 58 may operate in conjunction with a separate mixer such as a pugmill. However, in order to enhance system efficiency and to reduce VOC emissions upon mixing of the aggregate with the AC, the dryer 58 is preferably formed integral with the coater-mixer 60 to form a dryer drum coater. A suitable dryer drum coater is disclosed in detail in the Brock et al. patent, U.S.

Pat. No. 4,867,572, the disclosure of which is hereby incorporated in its entirety by reference. The illustrated dryer drum coater differs from that disclosed in the Brock et al. patent primarily in that the heat source for the dryer 58 comes principally from the gases fed to the dryer 58 from the catalytic reactor 16 via duct 42 rather than from a burner. The relevant features of the dryer 58 and coater-mixer 60 will now be discussed, it being understood that each component is described in greater detail in the Brock et al. patent.

The dryer 58 of the dryer drum coater preferably takes the form of an inclined counterflow rotary drum dryer so as to provide efficient drying. Dryer 58 thus has located at an upper end thereof an upper aggregate inlet 62 and an exhaust gas outlet 64 cooperating with the transfer conveyor 36 and a baghouse feed duct 66, respectively. The drum of dryer 58 also has at a lower end thereof a heating gas inlet 68 and an aggregate outlet (not shown) communicating with the dryer feed duct 50 and an aggregate inlet (not shown) of the coater-mixer 60, respectively.

Coater-mixer 60 comprises a fixed sleeve which surrounds the dryer 58 to define a mixing chamber between the outer periphery of the drum of dryer 58 and the inner periphery of the sleeve. The fixed sleeve has a liquid asphalt inlet 70 connected to a liquid asphalt supply line 72, a HMA outlet 74, and may include other inlets (not shown) such as a RAP inlet and a dust inlet.

The baghouse assembly 22 is conventional and may comprise any system capable of removing particulates from the gas stream discharged from the exhaust gas outlet 64 of the finishing dryer/mixer 14. The illustrated baghouse assembly 22 includes a cyclone 76 and a baghouse 78. The cyclone 76 has an inlet 80 connected to the baghouse feed duct 66 and an outlet 82 connected to an inlet 84 of the baghouse 78. The baghouse 78 has, in addition to the inlet 84, an outlet 86 venting to the atmosphere. An exhaust fan 88 draws exhaust gases through the system from the primary dryer 12, through the high efficiency cyclone 18, catalytic reactor 16, finishing dryer 58, and baghouse assembly 22.

Measures are also preferably taken to feed blue smoke from the mixing chamber of the finishing dryer/mixer 14 to the catalytic reactor 16. To this end, a blue smoke conduit 90 is provided having an inlet connected to an outlet port 94 of a blue smoke manifold 92 and having an outlet connected to an inlet port 96 formed in the reactor feed duct 42. Blue smoke manifold 92 surrounds the coater-mixer 60 and receives blue smoke from the mixing chamber via a plurality of circumferentially spaced holes extending through the fixed sleeve of the coater-mixer 60 and into the mixing chamber. If necessary, a small exhaust fan (not shown) may be provided in the conduit 90 to draw blue smoke through the manifold 92 and the conduit 90 and into inlet port 96 of duct 42. Oversizing such an exhaust fan should be avoided to assure an essentially balanced pressure between the mixing chamber and the interior of the dryer 58.

3. Operation of System

In use, raw virgin aggregate is fed into the aggregate inlet 26 of the primary dryer 12 via the conveyor 32 at a relatively low temperature of, e.g., 70° F. The aggregate is conveyed downwardly through the inclined dryer 12 in a conventional manner where it is heated by the flame from the burner 24. Aggregate is, however, heated to a lesser degree than is standard in the industry such that gases are exhausted from the exhaust gas outlet 28 at a sufficiently high temperature to react with the catalyst in the reactor 16. Thus, in the illustrated embodiment, the aggregate is discharged from the aggregate outlet 30 at a temperature of about 240° F., and the gas stream is vented from the exhaust gas outlet 28 at a temperature at or slightly above 800° F. These temperature values are attained by employing a parallel flow dryer rather than a more commonly employed counterflow dryer and, if necessary, by decreasing the dwell times of aggregate and/or gases in the dryer 12 by increasing the rotational speed of the dryer 12 and/or by drawing gases out of the exhaust gas outlet 28 at a higher than normal rate.

The gas stream exhausted from the exhaust gas outlet 28 of the primary dryer 12 is fed through the duct 34 into the gas inlet 38 of the high efficiency cyclone 18, where the dust content of the stream is reduced to a level which can be handled by the catalyst in the reactor 16. The relatively particulate free gas stream then flows out of the gas outlet 40 and through the duct 42, where it may if desired receive ammonia from the injection system 20 for reduction of a portion of the $NO_x$, and is then fed into the untreated gas inlet 46 of the catalytic reactor 16. The VOCs and $NO_x$ are reacted with the catalyst in the reactor 16 and are thereby removed from the gas stream in a manner which is, per se, well known.

In the finishing dryer 58, partially heated and dried virgin aggregate is supplied to the aggregate inlet 62 from the transfer conveyor 36 at a temperature of about 240° F., and heated gases are supplied to the lower heating gas inlet 68 from the duct 50 at a temperature of just below 800° F. The aggregate travels downwardly through the finishing dryer 58 in counterflow relation to the upwardly traveling gas stream and is heated by the gas stream to a temperature of over 300° F. before being discharged into the outer mixing chamber formed between the finishing dryer 58 and the fixed sleeve of the coater-mixer 60.

The gases supplied to the drying gas inlet 68 of the finishing dryer 58 from duct 50 should in most instances provide sufficient heat to the aggregate to raise the temperature of the aggregate sufficiently for the production of HMA. However, additional heat, if required, may be added via any suitable secondary heat source such as a secondary burner provided adjacent the lower end of the dryer 58 beside or surrounded by the inlet 68.

In the coater-mixer 60, aggregate received from finishing dryer 58 is mixed with AC, supplied through the liquid asphalt inlet 70 and possibly RAP and/or dust inlets (not shown), to form HMA in a manner which is described in detail in the Brock et al. patent. The HMA is then propelled by mixing paddles attached to the exterior of the drum of dryer 58 towards HMA outlet 74 before being discharged from the HMA outlet 74 at a temperature of about 300° F.

Blue smoke, formed in the mixing chamber of the finishing dryer/mixer 14 upon the mixing of AC with hot virgin aggregate, is exhausted from the mixing chamber into the manifold 92 and fed via the blue smoke conduit 90 into the reactor feed duct 42. The blue smoke is then drawn with the exhaust gases into the reactor 16, where the VOCs are reacted with the catalyst and removed from the gas stream. Since the blue smoke is removed from the coater-mixer 60 before it can be drawn into the dryer 58, and since few if any VOCs or $NO_x$ are produced in the finishing dryer 58, the gases exhausted from the outlet 64 of dryer 58 are essentially free of VOCs and $NO_x$.

It should be noted that although the blue smoke is at a significantly lower temperature than the remaining gases in the reactor feed duct 42, it makes up a comparatively small percentage of the materials supplied to the catalytic reactor 16 and thus does not sufficiently affect the temperature or dust content of the gas stream to adversely affect operation of the catalytic reactor 16.

After being exhausted from the exhaust gas outlet 64 of the finishing dryer/mixer 14, the exhaust gas stream is drawn by the fan 88 through the duct 66 and into the baghouse assembly 22 where particulates are removed in the cyclone 76 and the baghouse 78 in a manner which is, per se, well known. The gas stream, now essentially free of or at least exhibiting drastically reduced levels of VOCs, $NO_x$, and particulates, can then be exhausted to the atmosphere via the outlet 86.

It is estimated that the HMA plant 10 employing a catalytic reactor would remove VOCs and $NO_x$ much more effectively than is possible through burner design techniques and other emission reduction techniques currently employed in the industry. Indeed, it is estimated that use of the inventive system would meet even the most stringent emission standard likely to be imposed in coming years.

Many changes and modifications could be made to the present invention without departing from the spirit thereof. For instance, it is conceivable that the primary dryer and finishing dryer could be combined as a single two-stage device with the exhaust gases being removed at an intermediate point in the dryer (defining the end of a first or primary portion of the dryer) and being treated catalytically before being returned to a second or finishing portion of the dryer or otherwise treated. In addition, as discussed in pan above, the ammonia injection system could be eliminated or replaced or supplemented with other chemical injection systems, and the fixed sleeve coater-mixer 60 could be replaced with a pugmill or any other suitable coater-mixer. The scope of these and other changes will become apparent from the appended claims.

I claim:

1. A method comprising:
   (A) heating and partially drying virgin asphalt aggregate in a primary dryer;
   (B) removing a gas stream from said primary dryer; then
   (C) treating said gas stream with a catalyst thereby to reduce VOC and $NO_x$ levels in said gas stream; and then
   (D) further heating and drying said virgin aggregate with said treated gas stream in a finishing dryer.

2. A method as defined in claim 1, wherein said step (D) comprises
   (1) feeding said virgin aggregate into said finishing dryer,
   (2) feeding said gas stream into said finishing dryer after said gas stream is treated by said catalyst, and
   (3) conveying said virgin aggregate through said finishing dryer in contact with said gas stream.

3. A method as defined in claim 2, wherein said virgin aggregate is heated to a temperature of about 240° F. in said primary dryer and to a temperature of about 300° F. in said finishing dryer, and wherein said gas stream exits said primary dryer at a temperature of about 800° F. and exits said finishing dryer at a temperature of about 250° F.

4. A method as defined in claim 1, further comprising mixing said virgin aggregate with asphaltic cement after said step (D), thereby producing hot mix asphalt.

5. A method as defined in claim 4, wherein said further heating and drying step and said mixing step take place in a single finishing dryer/mixer.

6. A method as defined in claim 5, further comprising removing blue smoke from said finishing dryer/mixer and feeding said blue smoke into an untreated gas inlet of a catalytic reactor in which said step (C) is performed.

7. A method as defined in claim 1, further comprising removing dust from said gas stream after said gas stream is removed from said primary dryer and before said gas stream is treated by said catalyst.

8. The method of claim 7, wherein removing dust from said gas stream includes removing dust from said gas stream with a high efficiency cyclone.

9. A method as defined in claim 1, further comprising injecting a chemical into said gas stream after said gas stream is removed from said primary dryer and before said gas stream is treated by said catalyst.

10. A method as defined in claim 1, wherein said gas stream is at a temperature above 800° F. when said gas stream is treated by said catalyst.

11. A method comprising:
   (A) feeding virgin aggregate into a primary dryer; then
   (B) heating and drying said virgin aggregate in said primary dryer;
   (C) exhausting a gas stream from said primary dryer;
   (D) discharging said virgin aggregate from said primary dryer;
   (E) conveying said virgin aggregate from said primary dryer to a finishing dryer and then feeding said virgin aggregate into said finishing dryer;
   (F) removing dust from said gas stream;
   (G) treating said gas stream with a catalyst thereby to reduce VOC and $NO_x$, levels in said gas stream;
   (H) feeding said gas stream into said finishing dryer after said gas stream is treated by said catalyst; then
   (I) conveying said virgin aggregate through said finishing dryer in contact with said gas stream, thereby further heating and drying said virgin aggregate; and then
   (J) mixing said virgin aggregate with asphaltic cement.

12. A method as defined in claim 11, wherein
   (1) said step (B) comprises heating said virgin aggregate to a temperature of about 240° F.,
   (2) said gas stream is at a temperature above 800° F. during said step (H), and
   (3) said virgin aggregate is heated to a temperature of about 300° F. during said step (I).

13. An apparatus comprising:
   (A) a primary dryer having an aggregate inlet, an aggregate outlet, and an exhaust gas outlet;
   (B) a catalytic reactor having
      (1) an untreated gas inlet connected to said exhaust gas outlet of said primary dryer,
      (2) a treated gas outlet, and
      (3) a catalyst located between said untreated gas inlet and said treated gas outlet; and
   (C) a finishing dryer having
      (1) an aggregate inlet connected to said aggregate outlet of said primary dryer, and
      (2) a drying gas inlet connected to said treated gas outlet of said catalytic reactor.

14. An apparatus as defined in claim 13, further comprising a source of virgin aggregate connected to said aggregate inlet of said primary dryer, wherein said finishing dryer includes an exhaust gas outlet.

15. An apparatus as defined in claim 14, wherein said finishing dryer is a rotary counterflow dryer which forms part of a dryer drum coater which comprises (1) said rotary counterflow drier and (2) a fixed sleeve which surrounds said rotary counterflow dryer to define a mixing chamber therebetween.

16. An apparatus as defined in claim 15, further comprising a conduit having an inlet opening into said mixing chamber and an outlet communicating with said untreated gas inlet of said catalytic reactor.

17. An apparatus as defined in claim 13, further comprising a dust removal device having an inlet connected to said exhaust gas outlet of said primary dryer and having a gas outlet connected to said untreated gas inlet of said catalytic reactor.

18. An apparatus as defined in claim 17, wherein said dust removal device comprises a high efficiency cyclone.

19. An apparatus as defined in claim 13, further comprising a chemical injection system positioned between said primary dryer and said catalytic reactor.

20. A hot mix asphalt plant comprising:
- (A) a source of virgin aggregate;
- (B) a primary dryer having
  - (1) an aggregate inlet connected to said source of virgin aggregate,
  - (2) an exhaust gas outlet, and
  - (3) an aggregate outlet;
- (C) a dust removal device having an inlet connected to said exhaust gas outlet of said primary dryer and having a gas outlet;
- (D) a catalytic reactor having
  - (1) an untreated gas inlet connected to said gas outlet of said dust removal device,
  - (2) a treated gas outlet, and
  - (3) a catalyst located between said untreated gas inlet and said treated gas outlet;
- (E) a finishing dryer having
  - (1) an aggregate inlet communicating with said aggregate outlet of said primary dryer,
  - (2) a drying gas inlet connected to said treated gas outlet of said catalytic reactor,
  - (3) an aggregate outlet, and
  - (4) an exhaust gas outlet; and
- (F) a mixer having
  - (1) an aggregate inlet connected to said aggregate outlet of said finishing dryer,
  - (2) an asphaltic cement inlet, and
  - (3) a hot mix asphalt outlet.

21. A hot mix asphalt plant as defined in claim 20, wherein said finishing dryer and said mixer are combined in a dryer drum coater which comprises a counterflow rotary drum dryer and a fixed sleeve mixer surrounding said counterflow rotary drum dryer.

* * * * *